Patented Mar. 8, 1932

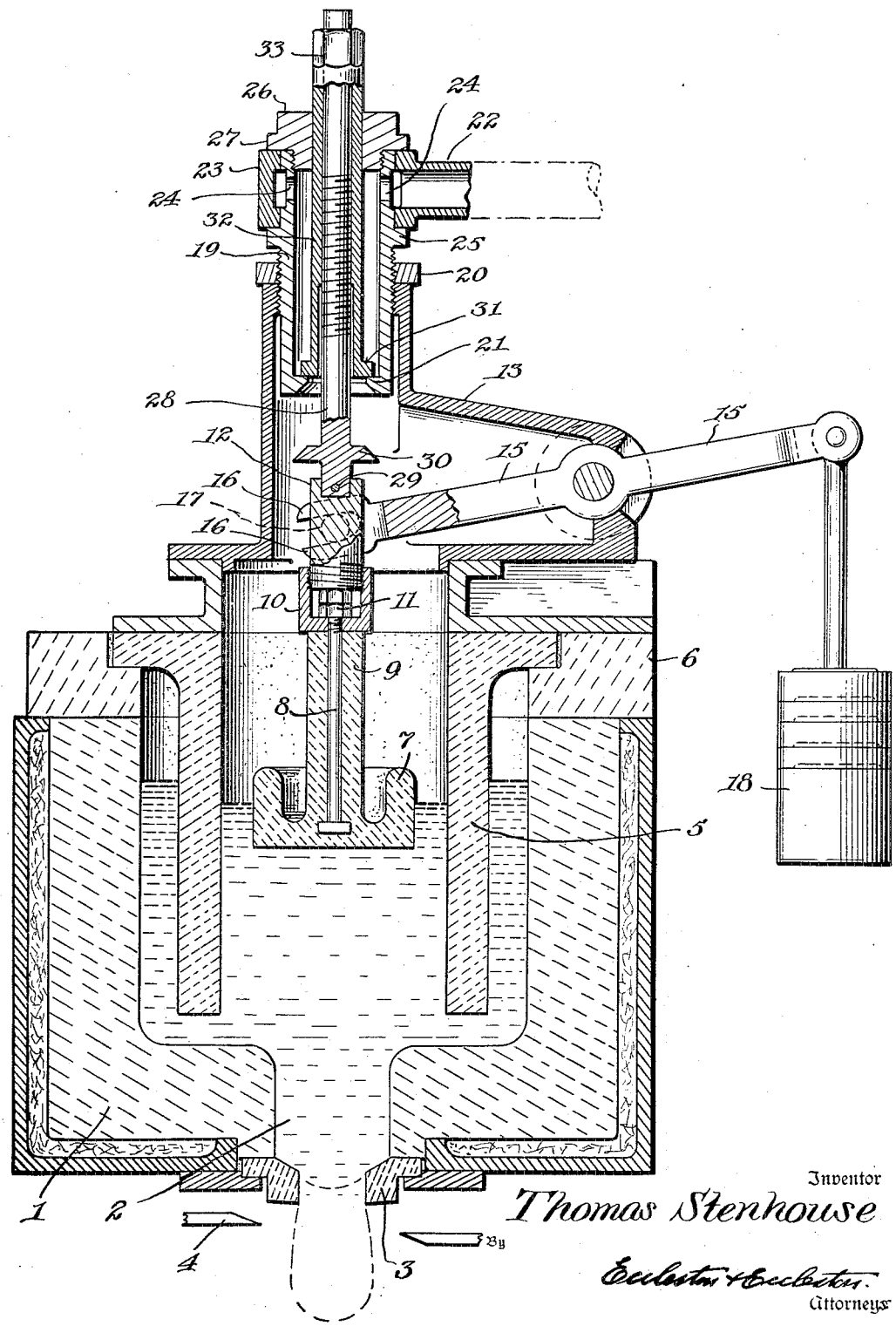

1,848,395

UNITED STATES PATENT OFFICE

THOMAS STENHOUSE, OF WASHINGTON, PENNSYLVANIA, ASSIGNOR TO HAZEL-ATLAS GLASS CO., OF WHEELING, WEST VIRGINIA, A CORPORATION OF WEST VIRGINIA

PNEUMATIC GLASS FEEDER

Application filed April 18, 1930. Serial No. 445,374.

The invention relates generally to that type of feeder in which glass charges are formed by periodically increasing and decreasing the pressure of air on the body of glass. Feeders of the pressure and vacuum type are old and well known; and have been very successful in commercial operation. However, such feeders must be operated with care; for otherwise it is possible that the body of glass may gradually rise, due to a building up of vacuum, or may gradually fall, due to a building up of pressure.

In accordance with the present invention, means is provided to prevent the glass from rising above a predetermined level, or from falling below a predetermined level. That is, the degree of vacuum may be increased or decreased, or the duration of the application of the vacuum may be increased or decreased, or the viscosity of the glass may increase or decrease, yet the glass will not be raised above a certain predetermined level, by reason of mechanism which is controlled by the level of the glass. Likewise, the pressure on the glass may be increased or decreased, and the duration of the application of pressure may be increased or decreased, and the viscosity of the glass may be increased or decreased, without the glass being lowered below a certain predetermined level. In other words, in the present invention, the rise of the glass to a certain level will automatically cause the application of vacuum to cease; and the fall of the glass to a certain level will cause the application of pressure to cease; the controlling means being operated by the level of the glass.

While in accordance with this invention the glass is automatically prevented from rising above a certain level, or falling below a certain level, yet the invention also provides for varying the level to which the glass may rise or fall, for varying the period during which the vacuum is applied, the period during which the pressure is applied, etc.

I do not present herein claims drawn to the broad subject-matter involved in the invention; such claims being presented in my application Serial No. 444,808, filed April 16, 1930.

The particular structure disclosed herein will now be described; reference being had to the accompanying drawing; in which the figure is a vertical sectional view of the feeder and flow spout.

Numeral 1 indicates a conventional flow spout having a flow orifice 2 provided with a removable bushing 3. Conventional shears, diagrammatically illustrated and referred to by numeral 4, are arranged below the flow orifice for severing the formed charges, which then drop into molds, in the usual manner.

Mounted in the flow spout, in alignment with the flow orifice, is the usual pressure and vacuum tube 5, supported by the cover 6 of the flow spout, and which projects downwardly into the glass to a point adjacent the floor of the flow spout. The glass normally rises in this tube to the level of the glass in the flow spout and tank. The flow spout may also be provided with the ordinary vertically adjustable gate of refractory material (not shown), for controlling or entirely shutting off the flow of glass. All of the structure thus far described is old and well known in the glass art.

Numeral 7 refers to a float of refractory material, which is adapted to float on the glass in the tube 5, and rise and fall with the glass. The lower portion of the float may be of any desired shape, such as an ordinary disc, or it may have a ball shape, etc.; the only essential being that it be so shaped as to rise and fall with the glass. In the form illustrated herein the float is of a general cup shape.

The float may be connected with the valve mechanism which it actuates, in any desired manner. In the form illustrated, a metal rod 8 has its lower end embedded in the body of the float, and the rod is protected by the refractory shank 9 which extends upwardly from the float proper. The upper end of the rod is secured to a collar 10, by means of nuts 11, and the collar is threaded onto, or otherwise attached to, the lower end of a coupling 12.

A metallic casing or housing is indicated by numeral 13. This casing or housing encloses the valve mechanism and associated parts, to be described hereinafter, and is mounted on top of the flow spout in sealed relation with the pressure and vacuum tube 5.

Journaled in the housing 13, and having an air-tight connection therewith, is a lever 15. The inner end of this lever is connected with the coupling 12 by appropriate means, as by fingers 16, which engage the lugs 17 projecting from opposite sides of the coupling. The opposite end of the lever 15 carries an adjustable counterweight 18, which counterbalances the float and the valve mechanism associated therewith, so that the float is free to rise and fall with the glass in the tube.

Numeral 19 refers to a valve seat body, which is exteriorly threaded for a portion of its length, whereby it may be screwed into the housing 13 a variable distance. Of course, the valve seat body has an air-tight connection with the housing; and it is preferably locked in adjusted position by means of a lock nut 20. The lower end of the valve seat body carries a double valve seat 21, which will be referred to hereinafter.

Numeral 22 indicates a pipe leading from sources of pressure and vacuum, not shown. It will be understood, of course, that an ordinary distributor controls the alternate application of pressure and vacuum through pipe 22. It is unnecessary to illustrate the distributor, as they have been known for many years, and per se form no part of the present invention. The pipe 22 is formed with a drum 23 which embraces the upper portion of the valve seat body, and communicates with the interior thereof by means of a series of ports 24 formed in the valve seat body. The drum rests on a collar 25 formed on the valve body; and the drum is secured in place and the upper end of the valve body sealed, by means of a cap 26 which is threaded into the upper end of the valve seat body; the cap having a flange 27 which projects over the drum. The swivel connection between the drum and valve seat body permits the latter to be rotated, for the purpose of vertical adjustment, without deranging the drum or the pipe 22 associated therewith.

Numeral 28 indicates a valve stem, which has its lower end connected to the coupling 12 by a pin 29. Any desired means may be employed to connect these parts, but I preferably employ a pin or the equivalent, in order to prevent rotation of the valve stem ralative to the coupling; the coupling being held against rotation by reason of its connection with the lever 15.

Formed integral with, or attached to, the lower portion of the valve stem 28, is a valve 30, which is arranged below the double valve seat 21. Arranged above the double valve seat, is a valve 31, having a cylindrical body 32, which is threaded on the valve stem 28, and extends upwardly through the cap 26, with which it has an air-tight connection. The member 32 preferably has its upper end squared, as indicated by numeral 33.

The operation of the feeder will now be briefly described.

The distributor will, as in the usual practice, admit air under pressure to the pipe 22, at the proper instant. This air under pressure will flow freely past the valve 31, into the housing 13, and thence into the tube 5, where it will exert its force on the glass therein.

The pressure acting on the glass in the tube will force the glass downward, thereby accelerating the flow of glass through the flow orifice 2. The extent to which the level of glass is lowered in the tube will depend upon the pressure of the air admitted to the tube, the length of time the glass is subjected to the pressure, and the temperature and viscosity of the glass.

In pneumatic feeders of the prior art, it has been impossible to automatically fix the level to which the glass in the tube is permitted to fall. In accordance with the present construction, however, as soon as the glass has fallen to a predetermined level, or in other words, when the desired amount of glass has passed through the bushing 3, the pressure will be automatically shut off. This highly desirable function is accomplished by the float 7 which floats downwardly with the glass, and its downward movement lowers the valve 31 accordingly. When the float has descended to the desired point the valve 31 will close against its seat 21, thereby preventing the further admission of air under pressure to the tube 5. In the figure, the glass has fallen to the desired level, and the valve 31 has seated.

The valve seat 21 may be adjusted up or down by the rotation of its body, which is threaded in the housing 13. By adjusting this valve seat up or down, the level to which the glass is permitted to descend, is easily varied. Or, the level to which the glass is permitted to descend may be maintained, and the extent of rise and fall of the glass may be varied by adjusting the distance between the valves 30 and 31; this adjustment being made by rotating the element 32 which is threaded on the valve stem and which carries the valve 31. By adjusting both the valve seat and the valves, any intermediate action may be obtained.

At the proper instant the distributor will, in the usual manner, cause suction to be applied to the pipe 22, as by a vacuum pump, vacuum tank, etc. The air will thus be withdrawn from the tube 5, and the glass will rise therein. As stated above, in pneumatic feeders of the prior art there has been no way of automatically determining the extent to which the glass falls in the tube; and likewise it was impossible in such prior feeders to automatically determine the extent to which the glass would rise under vacuum. In the present feeder the glass cannot rise above a predetermined level no matter how high the degree of vacuum may be, how long it is applied, or what the temperature and viscosity of the glass may be. For, as soon as the glass rises to a predetermined level, the float, which rises with the glass, will cause the valve 30 to engage the seat 21 and thus shut off communication between the tube 5 and the source of vacuum.

Any variations in the temperature and viscosity of the glass, are automatically taken care of in the present feeder, for if the temperature and viscosity changes so that the weight of the charge would ordinarily be reduced, the pressure will automatically continue in action longer, thus obtaining the same weight of charge; and if the temperature and viscosity change so that ordinarily the charge would be overweight, the duration of the pressure will automatically be reduced accordingly. So that while the present invention has been described generally as automatically controlling the pressure and vacuum in accordance with the rise and fall of the glass, it will be understood that it is substantially the equivalent of automatically controlling the pressure and vacuum to maintain the desired weight of charges.

The level to which the glass is permitted to rise, may be varied as desired, by adjusting the valve seat 21 up or down. Or the level to which the glass is permitted to rise may be maintained, and the extent of rise and fall may be varied by adjusting the distance between the valves 30 and 31. Any intermediate action may be obtained by adjusting both the valve seat and the valves.

The severing of the charges has not been described; it being understood that the charges, when formed, are severed in the usual manner.

The particular apparatus disclosed herein may be changed and modified in numerous respects, without departing from the spirit of the invention, and all such changes and modifications are intended to be included within the scope of the appended claims; it being understood that the claims drawn to the broad inventions involved, such as automatically regulating the level of the glass, regulating the level of the glass by the movement of the glass, controlling the duration of pressure application by the level of the glass, controlling the duration of vacuum application by the level of the glass, etc., are presented in my application, Serial No. 444,808, referred to hereinbefore.

What I claim is:

1. A pneumatic glass feeder including a flow spout having a flow orifice, a float in contact with the glass in the flow spout, a housing having an air-tight connection with the flow spout, a valve stem in said housing in substantially vertical alignment with the float, the valve stem and float being operatively connected, two valves carried by the valve stem, a valve seat body threaded in said housing in substantially vertical alignment with the float, a double valve seat carried by said body and positioned between said valves, and means whereby the pressure in said housing is periodically varied.

2. A pneumatic glass feeder including a flow spout having a flow orifice, a pressure and vacuum tube projecting downwardly into the glass in the flow spout and in alignment with the flow orifice, a float in contact with the glass in said tube, a valve stem connected with and extending upwardly from said float, valves carried by the valve stem and adapted to control the pressure and vacuum in accordance with the position of the float, a lever, a counterweight carried by one arm of the lever, the other arm of the lever being connected with the valve stem.

3. A pneumatic glass feeder including a flow spout having a flow orifice, a pressure and vacuum tube projecting downwardly into the glass in the flow spout and in substantial alignment with the flow orifices, a float in contact with the glass in said tube, a valve stem connected with and extending upwardly from said float, a housing having an air-tight connection with the tube and enclosing said valve stem, valves carried by the valve stem and adapted to control the pressure and vacuum, a lever, a counterweight carried by one arm of the lever, and means connecting the other lever arm with the valve stem.

4. A pneumatic glass feeder including a flow spout having a flow orifice, a pressure and vacuum tube projecting downwardly into the glass in the flow spout and in substantial alignment with the flow orifice, a housing communicating with the tube, a valve seat body adjustably mounted in the housing, a closure for the upper end of the valve seat body, a valve stem, a valve threaded on the valve stem, the body of said valve being slidably mounted in said closure, a float in contact with the glass, and an operative connection between the float and valve stem.

5. A pneumatic glass feeder including a flow spout having a flow orifice, a housing communicating with the flow spout, a member threaded in the top of said housing, said member carrying a valve seat at its lower end, a cap closing the upper end of said member, a valve body slidably mounted in said cap, a valve carried by the valve body and adapted to cooperate with the valve seat, a valve stem on which said valve body is threaded, and a float resting on the glass in the flow spout and operatively connected with said valve stem.

6. A pneumatic glass feeder including a flow spout having a flow orifice, a housing communicating with the flow spout, a member mounted in the top of said housing, means for vertically adjusting said member, said member carrying a valve seat at its lower end, a float resting on the glass in the flow spout, and a valve arranged between the float and the valve seat, the valve and float being operatively connected.

7. A pneumatic glass feeder including a flow spout having a flow orifice, a vacuum and pressure tube projecting downwardly into the glass in the flow spout in alignment with the flow orifice, a housing communicating with the tube, a member mounted in the top of said housing, means for vertically adjusting said member, a valve seat provided on the lower portion of said member, a cap closing the upper end of said member, means whereby the interior of said member alternately communicates with a source of pressure and vacuum, a float resting on the glass in said tube, a valve stem connected with said float and extending upwardly through the cap, a valve carried by the valve stem below said valve seat, a valve adjustably mounted on the valve stem above the valve seat, the body of the last-mentioned valve slidably mounted in and projecting upwardly beyond the said cap.

8. A pneumatic glass feeder including a flow spout having a flow orifice, a pressure and vacuum tube projecting downwardly into the glass in the flow spout in substantial alignment with the flow orifice, a housing communicating with the tube, a float resting on the glass in the tube, a valve stem extending upwardly from the float, two valves carried by the valve stem, means projecting upwardly beyond the housing for adjusting the distance between the valves, a double valve seat arranged between the valves, and means projecting upwardly beyond the housing for vertically adjusting the double valve seat.

THOMAS STENHOUSE.